Figures 1, 5:
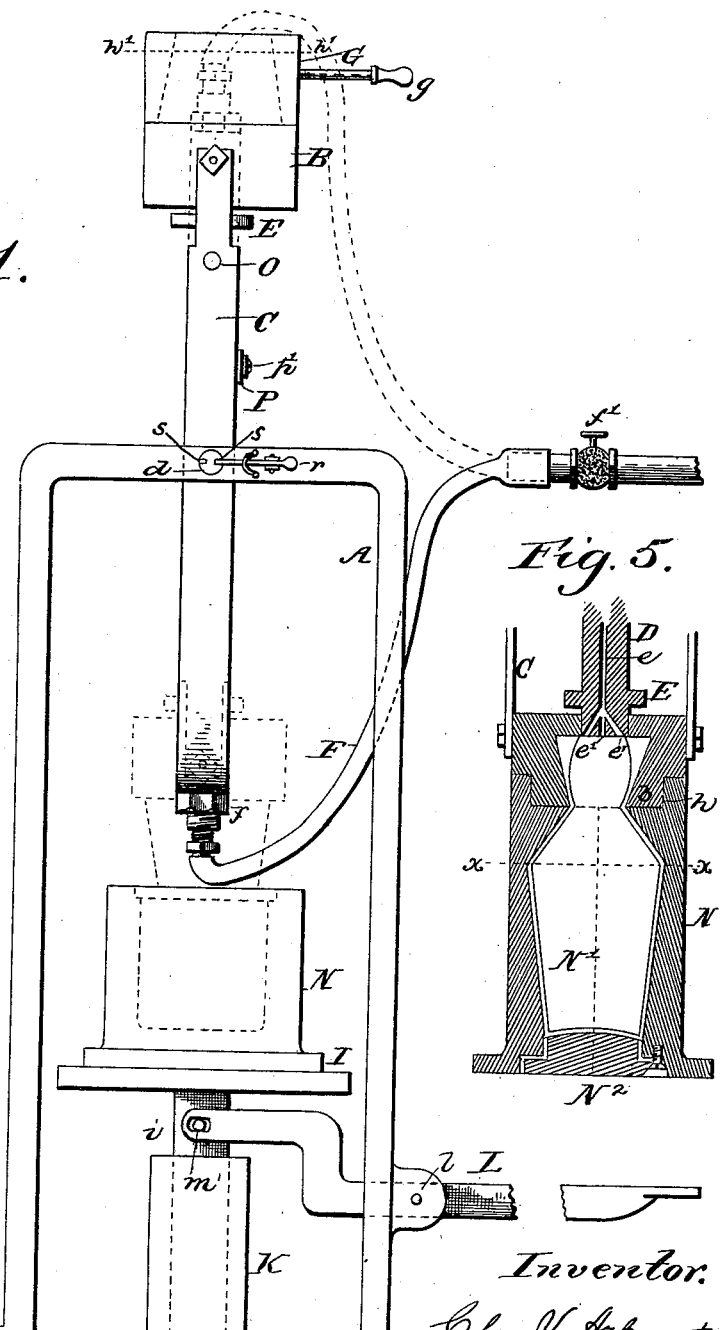

(No Model.) 2 Sheets—Sheet 1.
C. V. ARBOGAST.
METHOD OF AND APPARATUS FOR MAKING HOLLOW GLASSWARE.
No. 568,287. Patented Sept. 22, 1896.

Witnesses:

Inventor:
Chas. V. Arbogast
by Connolly Bros. Attys (No Model.)
C. V. ARBOGAST.
METHOD OF AND APPARATUS FOR MAKING HOLLOW GLASSWARE.
No. 568,287. Patented Sept. 22, 1896.
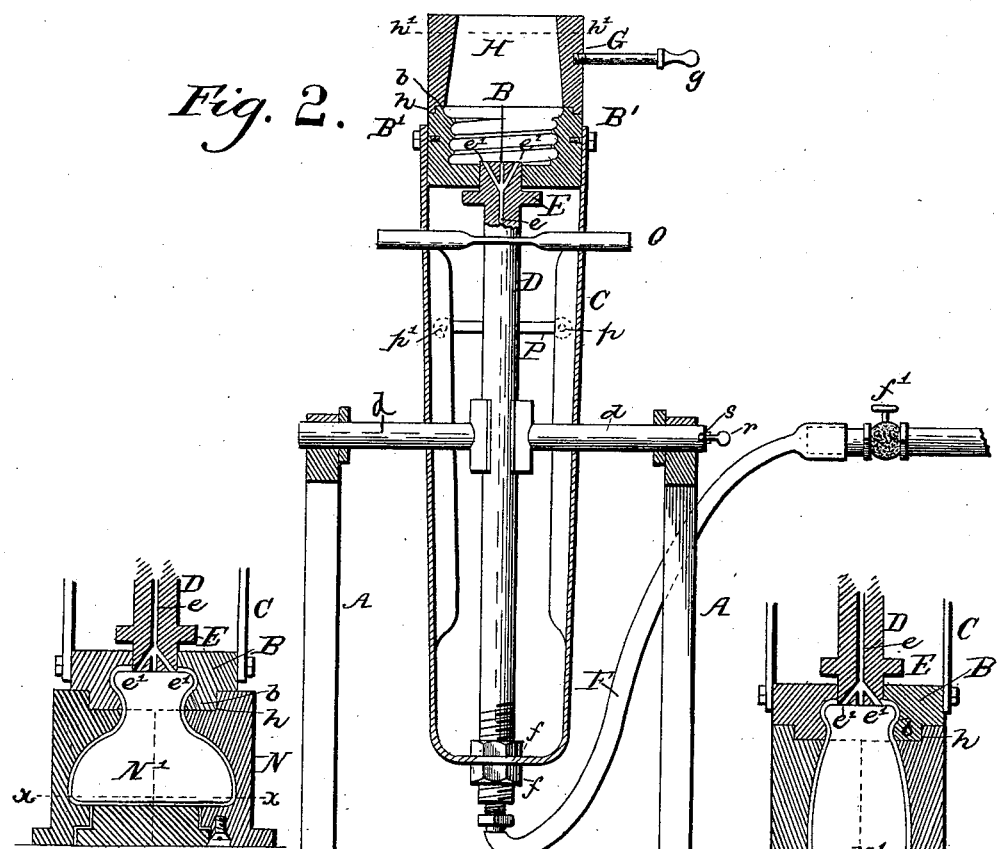
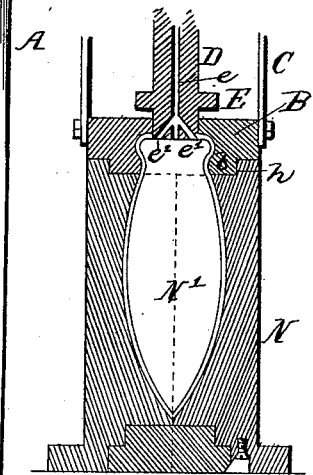
Witnesses:
Inventor:
Chas. V. Arbogast
by Connolly Bro. Attys.

UNITED STATES PATENT OFFICE.

CHARLES V. ARBOGAST, OF WASHINGTON, PENNSYLVANIA.

METHOD OF AND APPARATUS FOR MAKING HOLLOW GLASSWARE.

SPECIFICATION forming part of Letters Patent No. 568,287, dated September 22, 1896.

Application filed April 7, 1896. Serial No. 586,517. (No model.)

*To all whom it may concern:*

Be it known that I, CHARLES V. ARBOGAST, a citizen of the United States, residing at Washington, in the county of Washington and State of Pennsylvania, have invented certain new and useful Improvements in Methods of and Apparatus for Making Hollow Glassware; and I do hereby declare the following to be a full, clear, and exact descrip10 tion of the invention, such as will enable others skilled in the art to which it appertains to make and use the same.

My invention has relation to the manufacture of glassware, and has for its object the provision of a novel method of and apparatus for making hollow glassware, such as bottles, tumblers, incandescent bulbs, gas and lamp globes, shades, and pendants, &c.; and my invention consists in the novel method of manufacture and in the novel apparatus hereinafter described.

In the manufacture of hollow glassware as heretofore practiced two methods have generally been employed. One of these methods is to press the glass article to its completed shape at a single operation by the aid of a suitably-shaped mold and a plunger. The other method is to press a blank by the use of a mold and plunger (a portion of the arti30 cle, such, for instance, as the neck of a bottle, being completed by the pressing operation) and then blow the remaining portion of the article to its completed shape.

In carrying my invention into effect I form a blank by molding a mass of molten glass in a mold with that portion which is to form the bulbous portion or body of the article solid, and I finish the article solely by blowing up the bulbous portion or body of the glass.

In the accompanying drawings, in which I have illustrated an apparatus adapted to carry my invention into effect, Figure 1 is a side elevation, and Fig. 2 a vertical sectional view, of my improved apparatus; Figs. 3, 4, and 5, detail sectional views of different forms of molds required in the manufacture of various articles.

A A designate suitable side framings, upon which is pivotally supported a tool composed of a forming-mold B, made in two half-sections B' B', that are secured on the ends of a bent spring C, which is in turn attached to and supported by a hollow rod D, having trunnions $d$ $d$, journaled in the side framings A. The rod D is formed with a flanged head E, which projects through the bottom of the two-part forming-mold B, and an orifice $e$ in the rod D communicates with ports $e'$ $e'$ in the head E, these ports opening into the interior of the two-part mold B and being in a series close together, so as to constitute substantially an annular opening around the central port $e$. The lower end of the rod D passes through a hole in the bent portion of the spring C and is screw-threaded for the reception of the nuts F F, which serve to permit of the adjustment of the rod D with relation to the two-part forming-mold B B. A flexible pipe F is attached to the lower end of the rod D and communicates with a suitable source of supply of compressed air, and a cock or valve $f'$ is arranged on the pipe F, so as to regulate the supply of air. The cavity of the forming-mold B will, of course, be shaped to conform to the particular configuration of a part of the article to be made. In Fig. 1 of the drawings the particular configuration is that of the neck of a bottle having an exterior screw-thread. Upon top of the mold B is placed a flask G, which has a central opening or cavity H, that tapers slightly from end to end, the size of this cavity depending upon the quantity of the glass required to form the desired article. The flask G is provided with a handle $g$, by means of which it may be conveniently carried, and the mold B is formed with a flange $b$, which enters a recess $h$ in the flask G, so that when the flask is placed down over the mold it will fit neatly thereon and the cavity H of the flask will register accurately with the cavity of the mold.

Between the side framings A and upon the base or floor is arranged a vertically-movable table I, which is supported upon a standard $i$, that works in a suitable socket K, and a treadle L, which is pivoted at $l$ to the side framings A A, and which is pivotally attached at $m$ to the standard $i$, serves to elevate the table when the treadle is depressed by the foot of the operator. Upon the table I is placed a blow-mold N, which has a cavity N', corresponding in size and configuration to the exterior configuration which it is desired to impart to the blown portion of the completed article.

The blow-mold N is formed with a rabbet $n$, which is of such size that it will receive the flange $b$ of the forming-mold B, when the forming-mold B is turned over and the blow-mold N is elevated, as will be presently described. The blow-mold N is a one-piece mold and has in its bottom the ordinary valve $N^2$ common in press-molds.

A guide-rod O, which has a hole in its center for the passage of the rod D and the ends of which pass through the holes in the spring C, serves to center the rod D and its head E with relation to the two parts of the mold B.

A hook P is pivoted at $p$ to one of the arms of the spring C and engages with a pin $p'$ on the other arm of the spring, the purpose of the hook being to keep the mold B closed during the casting operation and until the completed article is to be removed from the mold.

A spring-latch $r$ on the side framing A engages with diametrically opposite notches $s$ $s$ on the journal $d$ and serves to hold the rod D and mold B in the vertical position in which they are shown in Figs. 1 and 2 and in the reverse position shown in dotted lines in Fig. 1.

The detail views, Figs. 3, 4, and 5, illustrate different forms of the molds B and N required to form various articles.

The molds B and N, Fig. 3, are adapted to form a pendent globe for an incandescent-electric lamp, the molds in Fig. 4 are adapted to form an ordinary gas-globe, and the molds in Fig. 5 to form a small glass drinking vessel, known as a "punch-tumbler," and in these modified forms the blow-mold is made in two or more pieces, as may be required.

Operation: The parts being constructed and arranged as shown in Figs. 1 and 2, the molten glass, which in carrying out my method should be in a very soft condition, is dropped into the forming-mold B and flask G, either from the end of a punty or out of a ladle by the gathering-boy, a sufficient amount being dropped in to form the complete article, the surface of the molten glass being indicated by the dotted line $h'$ $h'$ in Figs. 1 and 2. After the glass has been dropped, as described, it is allowed to settle in the forming-mold B until it has completely filled the mold and has come into intimate contact with every part of its internal surface. The glass is then allowed to stiffen slightly and the flask G is removed and the forming-mold B, rod D, and spring C are swung around on the trunnion $d$, the latch $r$ being released until the forming-mold B is directly over the blow-mold N, when the latch enters the notch on the other side the trunnion and holds the mold in this position. After the forming-mold B has been swung around over the blow-mold N, and while the depending mass of glass formed in the flask G is still soft or plastic, the blow-mold N is elevated by depressing the treadle L until the molds B and N are in contact, whereupon air is turned on by operating-valve $f'$, and, entering the forming-mold B by way of pipe F, hollow rod D, and ports $e'$ $e'$, blows the glass from the central part of the mass contained in the mold B and the mass formed by flask G outwardly and downwardly within the blow-mold N, and thus completes the formation of the article. After the article has been formed, as described, the mold N is lowered, leaving the completed article suspended from the forming-mold B, which is subsequently opened by unfastening the hook P, the article being taken off in a fork or snap or dropped into a suitable receptacle; or the mold B may be opened while the blow-mold N is still elevated, and the blow-mold N then lowered with the glass still in it and the latter removed when sufficiently cool by any of the ordinary appliances in use.

In using the molds shown in Fig. 3 the operation is carried on in the precise manner described, but when the molds shown in Figs. 4 and 5 are used, after the casting and blowing has been effected, the article is allowed to cool and is then cut off on the dotted lines $x$ $x$ to complete the article.

Ordinarily the mold N is made in one piece, but it may be made in two or more pieces where the article is of such shape that it cannot be drawn from a one-piece mold.

Having described my invention, I claim—

1. The method of manufacturing hollow glass articles, consisting in molding a solid mass of glass, thus partially completing the article and then forming a cavity in the mass solely by blowing, thus completing the hollow article, substantially as described.

2. The method of forming hollow glass articles having bulbous bodies, consisting in molding a mass of glass with that part which is to form the bulbous portion or body solid, thereby completing the formation of that portion of the article and then forming the cavity in and the rest of such article solely by blowing it, substantially as described.

3. The method of manufacturing hollow glass articles consisting in molding a solid mass of glass, thus partially completing the article, then forming a cavity in the mass solely by blowing and finally separating a part of the blown glass, substantially as described.

4. In an apparatus for forming glass articles, the combination of a forming-mold having an unobstructed cavity adapted to form a solid mass of glass, an air-pipe leading to the cavity of said mold, a flask adapted to be applied to said mold and removed therefrom and a blow-mold adapted to be applied to said forming-mold to complete the article by blowing when the flask is removed, substantially as described.

In testimony whereof I have affixed my signature in presence of two witnesses.

CHARLES V. ARBOGAST.

Witnesses:
JAMES A. WILEY,
R. C. MCCONNELL.